United States Patent [19]
Frey

[11] Patent Number: 4,610,837
[45] Date of Patent: Sep. 9, 1986

[54] APPARATUS AND METHOD FOR FORMING A CORRUGATED SHEET FROM A FLAT THERMOPLASTIC SHEET

[75] Inventor: Luther R. Frey, Peck, Kans.

[73] Assignee: The Boeing Company, Seattle, Wash.

[21] Appl. No.: 567,772

[22] Filed: Jan. 3, 1984

[51] Int. Cl.[4] B29C 53/28

[52] U.S. Cl. 264/339; 264/286; 425/369; 425/385; 425/394; 425/396; 425/397

[58] Field of Search 264/284, 286, 339, 293, 264/DIG. 40, DIG. 52, 288.4, 1.3, 1.6, 216; 425/336, 369, 370, 396, DIG. 54, 364 R, 403, 411, 471, 505, 520, 385, 394, 397

[56] References Cited

U.S. PATENT DOCUMENTS

| | | | |
|---|---|---|---|
| 2,080,899 | 5/1973 | Pirani et al. | 264/DIG. 40 |
| 2,446,771 | 8/1948 | Knowland | 264/284 |
| 3,150,576 | 9/1964 | Gewiss | 264/286 |
| 3,356,555 | 12/1967 | Jackson | 425/369 |
| 3,426,115 | 2/1969 | Taber | 264/339 |
| 3,439,428 | 4/1969 | Zelnick | 264/339 |
| 3,444,034 | 5/1969 | Hewett | 264/101 |
| 3,535,417 | 10/1970 | Henkes, Jr. | 264/284 |
| 3,685,931 | 8/1972 | Craven et al. | 425/520 |
| 3,792,952 | 2/1974 | Hamon | 425/371 |
| 3,888,618 | 6/1975 | Jones | 264/286 |
| 4,116,603 | 9/1978 | Lindgren | 264/286 |

FOREIGN PATENT DOCUMENTS

| | | | |
|---|---|---|---|
| 128052 | 5/1932 | Austria | 264/284 |
| 44-3992 | 2/1969 | Japan | 264/284 |

*Primary Examiner*—James Lowe
*Attorney, Agent, or Firm*—Edwin H. Crabtree

[57] ABSTRACT

An apparatus and a method for forming a corrugated sheet from a flat pre-laminated thermoplastic sheet. The flat sheet received between a pair of heated corrugated metal tool sheets with the tool sheets pulled between a pair of stationary tool press plates for forming and cooling the flat sheet into a corrugated sheet.

7 Claims, 1 Drawing Figure

10
12
14
16
18
20
22
24
26
28
30
32
33
34
36
37
40
42
44
46

APPARATUS AND METHOD FOR FORMING A CORRUGATED SHEET FROM A FLAT THERMOPLASTIC SHEET

BACKGROUND OF THE INVENTION

This invention relates to forming a flat sheet into an irregular shape and more particularly but not by way of limitation to the forming of a flat thermoplastic sheet into a corrugated sheet or any similar geometric or irregular design.

Heretofore, there have been various types of devices and methods for forming plastic materials into different types of shapes. These devices are described in the following U.S. Patents: U.S. Pat. Nos. 1,450,222 to Pattison, 2,968,336 to Monaco et al; 3,071,180 to Finger et al; 3,102,776 to Steinmann et al, 3,888,618 to Jones; 3,973,894 to Linder et al and 3,998,579 to Nordstrom.

None of the above mentioned patents particularly describe the unique features and structure for forming a corrugated sheet from a flat pre-laminated thermoplastic sheet as described herein.

SUMMARY OF THE INVENTION

A flat pre-laminated thermoplastic sheet is hard at room temperature and cannot be laid into a corrugated form tool as might be done with a fabric preimpregnated with thermosetting plastic. This apparatus forms a corrugated sheet from a flat thermoplastic sheet by feeding a flat thermoplastic sheet at a rate determined by the apparatus to form an irregular shape such as corrugations across the entire sheet.

Surface quality is attained in whatever plastic laminate is required by consolidating the flat sheet between heated tool sheets prior to any forming operation.

It is impossible to press hard thermoplastic flat sheets at any temperature into long corrugated sheets while applying pressure between matching form tools because material movement to fill in low spots is not possible in the sheet material without tearing the laminate.

The apparatus for receiving and forming flat thermoplastic laminated sheet into a corrugated sheet includes a first and second rewind drum. The drums include a first and second flexible corrugated metal tool sheet. One end of each tool sheet is attached to its respective drum and wrapped therearound. The other end of each tool sheet is attached to a pull cable. The pull cable is received between a pair of parallel upper and lower tool press plates. The pull cable pulls the two matching tool sheets from the rewind drums with the flat thermoplastic laminate sheet received therebetween. The two metal tool sheets are heated prior to entering the upper and lower tool press plates which in turn conduct heat to the flat sheet forming corrugations thereon. As the tool sheets and flat sheet are received between the upper and lower tool press plates the flat sheet is formed and cooled.

The advantages and objects of the invention will become evident from the following detailed description oi the drawings when read in connection with the accompanying drawings which illustrate preferred embodiments of the invention.

DETAILED DESCRIPTION OF THE DRAWINGS

Figure 1:
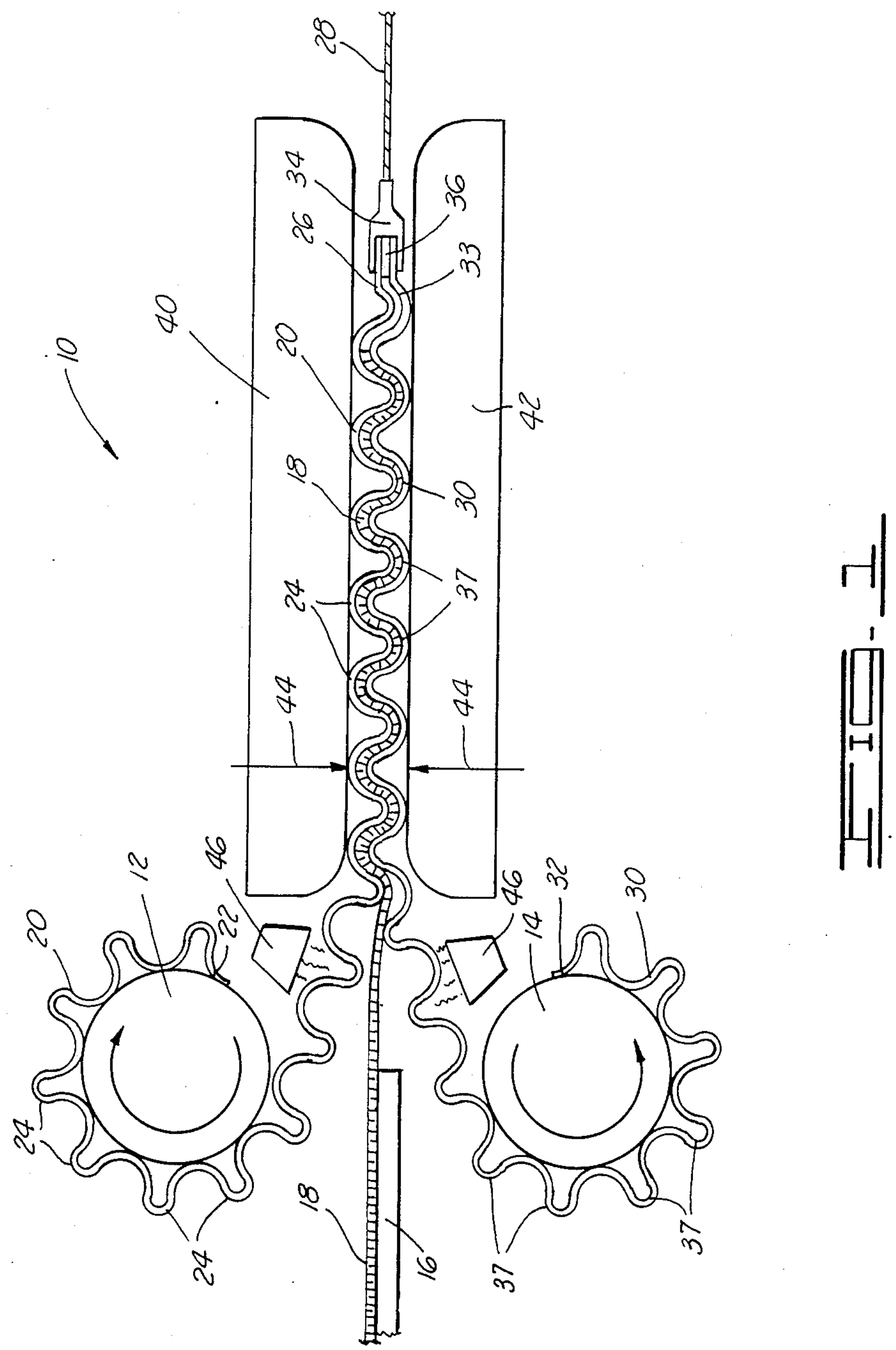
FIG. 1 illustrates a side view of the apparatus for forming a corrugated sheet from a flat thermoplastic sheet.

In FIG. 1 the apparatus for forming a corrugated sheet, or any other irregular shape for that matter, from a flat thermoplastic sheet is designated by general reference numeral 10. The apparatus 10 includes a first rewind drum 12 and a second rewind drum 14 disposed in a spaced relationship from each other. Mounted between the two drums 12 and 14 is a table 16 for supporting a flat pre-laminated thermoplastic sheet 18 thereon.

A first flexible corrugated metal tool sheet 20 includes one end 22 attached to the drum 12. The first tool sheet 20 has a plurality of corrugations 24 therein. Another end 26 of the sheet 20 is attached to a pull cable 28. The rewind drums 12 and 14 have adjustable braking resistance to control tension on tool sheet 20.

A second flexible corrugated metal tool sheet 30 has one end 32 attached to the second rewind drum 14 and wrapped therearound. Another end 33 of the sheet 30 is also attached to the pull cable 28 by a clamp 34 having a spacer 36 received between the ends 26 and 33 for holding the tool sheets 20 and 30 in a spaced relationship for receiving the flat thermoplastic sheet 18 therebetween. The sheet 30 also includes corrugations 37 which are indexed with the corrugations 24 of the sheet 20 as the two sheets 20 and 30 are unwound from the drums 12 and 14.

The pull cable 28 is received between a flat stationary upper tool press plate 40 and a flat stationary lower tool press plate 42. The tool plates 40 and 42 are dimensioned in a spaced relationship from each other wherein space "A" between arrows 44 is slightly less than the free height of the tool sheets 20 and 30 indexed together with the flat sheet 18 received therebetween.

Prior to the tool sheets 20 and 30 along with the flat sheet 18 entering between the tool plates 40 and 42 the tool sheets 20 and 30 are heated by any type of conventional heaters 46 which in turn conduct heat to the flat sheet 18 as it enters the left end of the upper tool plate 40 and lower tool plate 42. Some pre-heating of the flat laminate sheet may be required. As the tool sheets 20 and 30 along with the flat sheet 18 are drawn from left to right between the tool plates 40 and 42, the flat sheet 18 is compressed, formed and cooled into a corrugated sheet. The feed rate of flat sheet 18 is controlled by the meshing tool sheets 20 and 30. The rate would necessarily be variable. The flat sheet 18 would normally be cut to size and would not exceed the length of the plates 40 and 42.

The formed and cooled laminated sheet is then withdrawn by relaxing tension on cable 28, turning off heaters 46 and rewinding drums 12 and 14, thus receiving the finished part on table 18. Apparatus 10 is then ready for subsequent forming of another sheet.

While corrugations are shown, it should be kept in mind that any irregular shape using the apparatus 10 as described above would work equally well using the unique features and advantages of the subject apparatus 10 for forming irregular shapes in the flat pre-laminated thermoplastic sheet 18.

Changes may be made in the construction and arrangment of the parts or elements of the embodiments as described herein without departing from the spirit or scope of the invention defined in the following claim.

What is claimed is:

1. An apparatus for receiving and forming a flat thermoplastic sheet into an irregular sheet, the apparatus comprising:
   - a first rewind drum;
   - a second rewind drum disposed in a spaced relationship from the first rewind drum;
   - a first flexible metal tool sheet, one end of the sheet attached to the first rewind drum and wrapped therearound, the other end of the tool sheet attached to a pull cable;
   - a second flexible metal tool sheet, one end of the tool sheet attached to the second rewind drum and wrapped therearound, the other end attached to the pull cable;
   - a flat stationary upper tool press plate; and
   - a flat stationary lower tool press plate, the pull cable received between the upper tool plate and the lower tool plate, the pull cable pulling the first and second tool sheets and the flat thermoplastic sheet between the upper tool plate and the lower tool plate and forming and cooling the flat thermoplastic sheet.

2. The apparatus as described in claim 1 wherein the first and second tool sheets are preheated by a heater as the sheets are unwound from the rewind drums and prior to the tool sheets being received between the upper and lower tool plates.

3. The apparatus as described in claim 1 further including a flat table disposed adjacent the first and second rewind drums for receiving the flat thermoplastic sheet thereon.

4. The apparatus as described in claim 1 wherein the pull cable includes a clamp for securing the ends of the first and second tool sheets to the pull cable and a spacer inserted between the ends of the tool sheets for holding the tool sheets apart in a spaced relationship for receiving the flat sheet therebetween.

5. The apparatus as described in claim 1 wherein the space between the upper tool plate and lower tool plate is slightly less than the free height between the first and second tool sheets and the flat sheet received therebetween.

6. An apparatus for receiving and forming a flat thermoplastic sheet into a corrugated sheet, the apparatus comprising:
   - a first rewind drum;
   - a second rewind drum disposed in a spaced relationship from the first rewind drum;
   - a first flexible corrugated metal tool sheet, one end of the sheet attached to the first rewind drum and wrapped therearound, the other end of the sheet attached to a pull cable;
   - a second flexible corrugated metal tool sheet, one end of the sheet attached to the second rewind drum and wrapped therearound, the other end of the sheet attached to the pull cable;
   - a stationary upper tool press plate; and
   - a stationary lower tool press plate disposed in a spaced relationship from the upper tool plate and parallel thereto, the pull cable received between the upper tool plate and lower tool plate for pulling the first and second metal tool sheets therebetween with the flat sheet received between the first and second tool sheets for forming corrugation therein as the first and second tool sheets and flat sheet are pulled between the stationary upper and lower tool plates.

7. A method for forming a flat thermoplastic sheet into a corrugated sheet, the steps including:
   - heating a pair of metal corrugated tool sheets mounted on rewind drums;
   - inserting a flat thermoplastic sheet between the two metal tool sheets.,
   - pulling the two corrugated metal tool sheets between a stationary upper tool press plate and a stationary lower tool press plate with the flat sheet therebetween;
   - compressing and forming the flat sheet into a corrugated sheet as the metal tool sheets are compressed between the upper tool plate and lower tool plate; and
   - cooling the corrugated thermoplastic sheet between the upper and lower tool plates.

* * * * *